United States Patent [19]

Saito

[11] 4,044,044

[45] Aug. 23, 1977

[54] ANAEROBIC ADHESIVE COMPOSITION CONTAINING 0.05 TO 20 PARTS PER WEIGHT OF PHOSPHATE ESTERS OF HYDROXYACRYLATES PER 100 PARTS PER WEIGHT OF POLYMERIZABLE ACRYLIC ESTER MONOMER

[76] Inventor: Tsutomu Saito, 1459, Hazama-cho, Hachioji, Tokyo, Japan

[21] Appl. No.: 679,011

[22] Filed: Apr. 21, 1976

[30] Foreign Application Priority Data

Apr. 21, 1975 Japan .................................. 50-48488

[51] Int. Cl.$^2$ .......................... C08F 4/34; C08F 30/02; C08F 130/02; C08F 230/02
[52] U.S. Cl. ............................... 260/47 UA; 156/332; 526/230; 526/278
[58] Field of Search .................. 260/47 UA; 526/277, 526/232

[56] References Cited

U.S. PATENT DOCUMENTS

| | | | |
|---|---|---|---|
| 3,751,399 | 8/1973 | Lee, Jr. et al. | 260/47 UA |
| 3,770,811 | 11/1973 | Lee, Jr. et al. | 260/47 UA |
| 3,855,364 | 12/1974 | Steckler | 526/277 |
| 3,890,273 | 6/1975 | Saito | 260/47 UA |
| 3,944,521 | 3/1976 | Bradley et al. | 260/47 UA |
| 3,957,561 | 5/1976 | Skoultchi | 260/47 UA |

*Primary Examiner*—Herbert J. Lilling
*Attorney, Agent, or Firm*—Donald D. Mon

[57] ABSTRACT

In an anaerobic adhesive composition comprising an anaerobically polymerizable acrylic ester monomer and an organic peroxide, the composition further contains a phosphorus compound in an amount of at least 0.05 weight percent to the weight of said monomer, thereby to possess excellent adhesive force.

13 Claims, No Drawings

ANAEROBIC ADHESIVE COMPOSITION CONTAINING 0.05 TO 20 PARTS PER WEIGHT OF PHOSPHATE ESTERS OF HYDROXYACRYLATES PER 100 PARTS PER WEIGHT OF POLYMERIZABLE ACRYLIC ESTER MONOMER

BACKGROUND OF THE INVENTION

This invention relates to an anaerobic adhesive composition which possesses excellent adhesive force.

An anaerobic adhesive composition is generally kept in liquid state as long as it remains in contact with air or oxygen, while it is rapidly cured by polymerization under the exclusion of the air or oxygen. Thus, it is widely utilized as sealing materials, such as for loosening prevention materials for threaded-together bolts and nuts, adhesives for mating portions of a bearing or a pulley and leak preventing materials for liquid or gas having a high pressure or high temperature.

This composition is utilized, for example, as stated below, when it is used as loosening prevention materials for bolts and nuts. First of all, the screw parts of bolts and nuts are coated with the composition (under this condition, the composition is kept in liquid state since it remains in contact with air), and next, they are mutually tightened.

As a result, air is excluded from the composition and the composition between the surfaces is rapidly cured by polymerization. Accordingly, the composition prevents the bolts and nuts from loosening and furthermore seals the gap between them. It is also utilized as a sealing material for mating portions in the same manner as mentioned above.

Various kinds of anaerobic polymerizable compositions are well known.

Some of them are indicated as follows.

1. Adhesives comprising, as main ingredients, a mixture of 2-hydroxyethyl methacrylate and organic peroxides.

2. Adhesives comprising, as main ingredients, a mixture of anaerobically polymerizable monomer having the following general formula and organic peroxides.

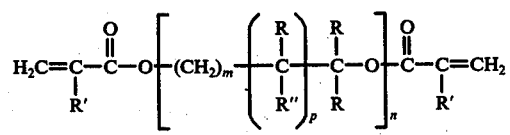

In which, R represents hydrogen, low alkyl radicals having from 1 to 4 carbon atoms, hydroxyl alkyl radicals having 1 to 4 carbon atoms or

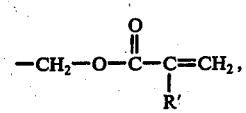

R' represents hydrogen, halogens, or low alkyl radical having 1 to 4 carbon atoms, R" represents hydrogen, OH or

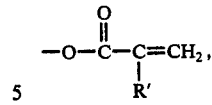

$m$ represents an integer at least equal to 1, for example, form 1 to 8, or from 1 to 4, $n$ represents an integer more than 1, for example, from 1 to 20 or more, and P represents 0 or 1.

3. Adhesives comprising a mixture of a compound having the following general formula and organic peroxides.

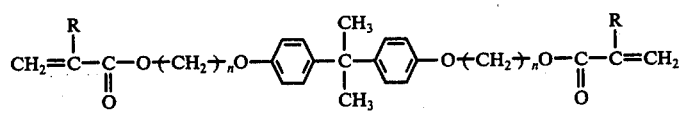

In which, R represents hydrogen, methyl radical or ethyl radical, $n$ represents an integer from 1 to 8.

The adhesive strength of these materials is relatively small, especially in fitting compression-shearing adhesive force and tensile-shearing adhesive force.

SUMMARY OF THE INVENTION

Accordingly, it is an object of the present invention to provide an anaerobic adhesive composition having an enhanced adhesive force, especially, enhanced adhesive force of fitting-compressive-shearing and tensile shearing adhesive force, thereby to overcome the afore-mentioned faults existing in the prior arts.

According to the present invention, these and further objects are accomplished by providing an anaerobic adhesive composition comprising an anaerobically polymerizable acrylic ester monomer and an organic peroxide characterized wherein said composition contains therein phosphorus compounds having the following general formulas [A] and [B] singly or in combination, in an amount of at least 0.05 weight percent to the weight of said monomer, thereby to enhance an adhesive force of the composition;

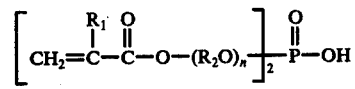

[A]

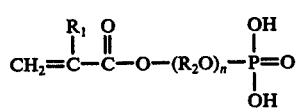

[B]

in the formulas [A] and [B], $R_1$ indicates H, $CH_3$, or $C_2H_5$, $R_2$ indicates $-CH_2-$, $-C_2H_4-$, $-C_3H_6-$ or

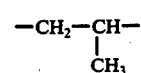

and $n$ indicates an integer from 1 to 10.

These and other features and advantages of the present invention will become apparent from the following detailed description.

DETAILED DESCRIPTION

An anaerobic adhesive composition of the present invention is obtained by adding the above-mentioned phosphorus compounds [A] or [B] into the mixture of anaerobically polymerizable acrylic ester monomer and an organic peroxide, followed by homogeneously mixing the same.

The afore-mentioned anaerobically polymerizable acrylic esters can be any of the well-known compounds. Some of the examples are indicated as follows.

1. Monomers having a general formula of

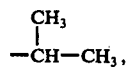

[1]

wherein, $R_1$ represents hydrogen or alkyl radicals having from 1 to 4 carbon atoms, $R_2$ represents —CH$_2$—CH$_3$, —CH$_2$—CH$_2$—CH$_3$ or

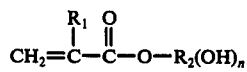

in each of which, the hydrogens are released at arbitrary portions to form bonds for being combined with OH radicals, and $n$ represents an integer of from 1 to 3.

These monomers having the general formula [1] mentioned above are indicated below.

2-hydroxyethyl methacrylate, 1-hydroxyethyl methacrylate, 2-hydroxypropyl methacrylate, 1-hydroxypropyl methacrylate, 1,2-di-hydroxyethyl methacrylate, 1,2,3-tri-hydroxypropyl methacrylate, 2-hydroxyacrylate, etc.

The monomer having the afore-mentioned general formula may be a reactive products with isocyanate.

2. Monomers having a general formula of

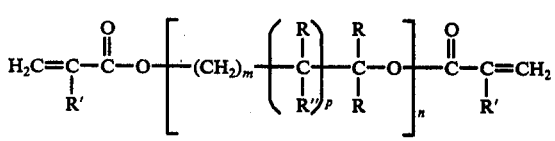

[2]

wherein, R represents hydrogen, —CH$_3$, —C$_2$H$_5$, —CH$_2$OH or

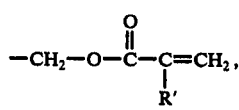

R' represents hydrogen, chlorine, methyl or ethyl radical, R'' represents hydrogen, —OH or

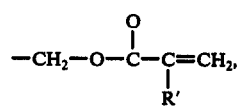

$m$ represents an integer of from 1 to 8, $n$ represents an integer of from 1 to 20, and P represents 0 or 1.

Among the formula [2] can be di-ethylene glycol di-methacrylate, tri-ethylene glycol di-acrylate, tri-ethylene glycol di-methacrylate, tetra-ethylene glycol di-methacrylate, 1,2-propylene glycol di-methacrylate, di-propylene, glycol di-methacrylate, polyethylene glycol di-methacrylate, di-(penta-methylene glycol) di-methacrylate, tetra-ethylene glycol di-acrylate, tetra-ethylene glycol di-(chloro-acrylate), di-glycerol di-acrylate, glycerine tri-methacrylate, tri-methylol propane tri-methacrylate, di-glycerol tetra-methacrylate, etc.

3. Monomers having a general formula of

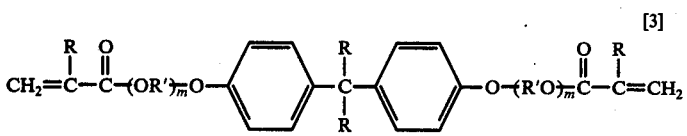

[3]

wherein, R represents hydrogen or alkyl radical having from 1 to 4 carbon atoms, R' represents alkylene radical having from 2 to 4 carbon atoms, and $m$ represents an integer of from 2 to 8.

Monomers having general formula [3] can be 2,2-bis (4-methacryloxy di-ethoxy phenyl) propane, 2,2-bis (4-methacryloxy tri-ethoxy phenyl) propane, 2,2-bis (4-methacryloxy tetra-ethoxy phenyl) propane, 2,2-bis (4-methacryloxy penta-ethoxy phenyl) propane, 2,2-bis (4-methacryloxy hexa-ethoxy phenyl) propane, 2,2-bis (4-methacryloxy hepta-ethoxy phenyl) propane, 2,2-bis (4-methacryloxy octa-ethoxy phenyl) propane, 2,2-bis (4-methacryloxy di-propoxy phenyl) propane, 2,2-bis (4-methacryloxy tri-propoxy phenyl) propane, 2,2-bis (4-methacryloxy octa-propoxy phenyl) propane, 2,2-bis (4-methacryloxy di-butoxy phenyl) propane, 2,2-bis (4-methacryloxy tri-butoxy phenyl) propane 2,2-bis (4-methacryloxy octa-butoxy phenyl) propane, 2,2-bis (4-acryloxy di-ethoxy phenyl) propane, 2,2-bis (4-acryloxy di-butoxy phenyl) propane, 2-(4-methacryloxy di-ethoxy phenyl)-2(4-methacryloxy tri-ethoxy phenyl) propane, 2-(4-methacryloxy di-propoxy phenyl)-2(4-methacryloxy tri-ethoxy phenyl) propane, 2,2-bis (4-α-ethyl acryloxy di-ethoxy phenyl) propane, 2,2-bis (α-propyl acryloxy di-ethoxy phenyl) propane, 2-(4-α-ethyl acryloxy di-ethoxy phenyl)-2(4-methacryloxy di-ethoxy phenyl) propane, etc.

These monomers are preferably pure, but, they are allowable as industrial quality containing very small amounts of inhibitors, stabilizers, etc.

In this invention, said monomers may be used singly or in combination of two or more.

Organic peroxides used in the present invention act as polymerization initiators, and are exemplified as: benzoil peroxide, methyl ethyl ketone peroxide, cyclohexanone peroxide, cumene hydroperoxide, di-tertiary butyl peroxide, lauroyl peroxide, di-cumyl peroxide, etc.

These are used in the present invention in a suitable amount.

Furthermore, in the present invention it is allowable to use, as a polymerization initiator, a combination of n-dodecyl mercaptan and O-sulfo-benzoic imide, instead of these organic peroxides.

The most important and advantageous feature of the present invention resides, as mentioned above, in using phosphorus compounds [A] and [B] singly, or incombination, respectively having the following general formulas.

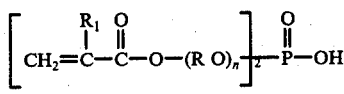

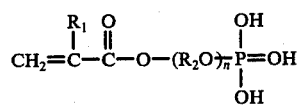

In the formulas [A] and [B], $R_1$ represents H, $CH_3$ or $C_2H_5$, $R_2$ represents $-CH_2-$, $-C_2H_4-$, $-C_3H_6$ or

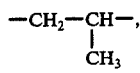

and $n$ represents an integer of 1 to 10.

Said formula [A] can be, for example, bis (2-hydroxy ethyl methacrylate) acid phosphate (Trade Mark "J P A 514" made by JOHOKU CHEMICAL CO., LTD., JAPAN) and the formula [B] can be, for example, 2-hydroxy ethyl methacrylate acid phosphate (Trade Mark "J P A 515" made by JOHOKU CHEMICAL CO., LTD., JAPAN).

These phosphorus compounds [A] or [B] are added in an amount of at least 0.05 weight percent, desirably in an amount ranging from 0.05 to 20 weight percent, and more desirably in an amount ranging from 0.1 to 10 weight percent to the weight of said monomer.

In case that said addition amount is less than 0.05 weight percent, it is impossible to obtain the desired advantages of the present invention. Moreover, in case that said addition amount is in excess, the phosphorus compounds are precipitated into the composition as an insoluble material. Therefore the preferred amount to be added is as small as possible. (The amount is generally below about 20 weight percent although it depends on the kinds of monomer being used.)

Furthermore, the present invention may contain a suitable amount of polymerization accelerators. Said polymerization accelerators can be ortho-sulfo benzoic imide, 1,2,3,4-tetra-hydro quinoline or triethylamine, and the addition amounts thereof are in the range of, respectively, from 0.2 to 2 by weight parts of ortho-sulfo benzoic imide, from 0.1 to 1 by weight parts of 1,2,3,4-tetra-hydroquinoline and from 0.1 to 1 by weight part of triethylamine to 100 parts of weight of monomer mixture.

Therefore, the compositions of this invention are anaerobically cured by polymerization and exhibit excellent adhesive force, especially, excellent adhesive force of fitting - compression - shearing and excellent adhesive force of tensile shearing.

The following examples are given by way of illustration, and are not to be construed to limit the scope of the invention.

EXAMPLES 1 TO 5

An anaerobically polymerizable monomer, a phosphorus compound, an organic peroxide and accelerator were blended in the compounding ratio designated on Table I and homogeneously mixed to obtain compositions of, respectively, samples Nos. 1a, 1b, 1c, 1d, 2a, 2b, 2c, 2d, 3a, 3b, 3c, 3d, 4a, 4b, 4c, 4d, 5a, 5b, 5c, 5d.

Then, each of these compositions was tested to measure the adhesive force of fitting - compressive - shear and tensile shear. The results are shown on Table I. The measurements were carried out under the following conditions.

Fitting - Compression - Shearing Adhesive Force

Each of said compositions was coated on the inner wall of the ring or the shaft of the under-mentioned test piece. (Both of said coatings are allowable). The shaft was inserted into the ring for fitting, and the fitted test piece was allowed to stand at a temperature of 120° C. for 1 hour to anaerobically cure the coated composition by polymerizaton. The thus cured test piece was compressed under the condition designated below to measure fitting - compression - shearing adhesive force.

Test machine: Tensilon (produced by Toyo Sokki Co., Ltd., Japan)
Compression speed: 10 mm/min.
Adhered area: 2.8 cm²
Test piece:
  Ring - Length: 15 mm, Outer diameter: 15 mm, Inner diameter: 6.02 mm
  Shaft - Length: 50 mm, Diameter: 6 φ

Tensile Shearing Adhesive Force

Each of said compositions was coated on the under-mentioned test piece, and the thus coated test piece was left standing in a circumstance of a temperature of 120° C for 1 hour for curing. The cured test piece was submitted for tensile shearing test to thereby measure tensile shearing adhesive force.

Test machine: Tensilon (produced by Toyo Sokki Co., Ltd., Japan)
Tensile speed: 10 mm/min.
Adhered area: 2.5 cm² Test piece: Japan Industrial Standard (JIS) G 3141 1.0 × 25 × 100 mm cold rolling, bright steel plate Table I (Numbers: part(s) by weight)

| Ingredients | | Example No. | 1 | | | | 2 | | | | 3 | | | | 4 | | | | 5 | | | |
|---|---|---|---|---|---|---|---|---|---|---|---|---|---|---|---|---|---|---|---|---|---|---|
| | | Sample No. | 1a | 1b | 1c | 1d | 2a | 2b | 2c | 2d | 3a | 3b | 3c | 3d | 4a | 4b | 4c | 4d | 5a | 5b | 5c | 5d |
| Anaerobically polymerizable monomers | | 2,2bis(4-methacryloxy diethoxy phenyl)propane | 100 | 100 | 100 | 100 | — | — | — | — | — | — | — | — | 80 | 80 | 80 | 80 | — | — | — | — |
| | | Trimethylol propane trimethacrylate | — | — | — | — | 100 | 100 | 100 | 100 | — | — | — | — | 20 | 20 | 20 | 20 | — | — | — | — |
| | | 2-hydroxyethyl methacrylate | — | — | — | — | — | — | — | — | 100 | 100 | 100 | 100 | — | — | — | — | — | — | — | — |
| | | Tetra-ethylene glycol dimethacrylate | — | — | — | — | — | — | — | — | — | — | — | — | — | — | — | — | 100 | 100 | 100 | 100 |
| Phosphorus compounds | | Bis(2-hydroxyethyl methacrylate) acid phosphate (JPA 514) | — | 0.2 | 0.4 | — | — | 0.2 | 0.4 | — | — | 0.2 | 0.4 | — | — | 0.2 | 0.4 | — | — | 0.2 | 0.4 | — |
| | | 2-hydroxyethyl methacrylate acid phosphate (JPA 515) | — | — | — | 0.4 | — | — | — | 0.4 | — | — | — | 0.4 | — | — | — | 0.4 | — | — | — | 0.4 |
| Organic peroxides | | Cumene hydroperoxide | 2 | 2 | 2 | 2 | 2 | 2 | 2 | 2 | 2 | 2 | 2 | 2 | 2 | 2 | 2 | 2 | 2 | 2 | 2 | 2 |
| Accelerator | | Ortho-sulfo benzoic imide | 1 | 1 | 1 | 1 | 1 | 1 | 1 | 1 | 1 | 1 | 1 | 1 | 1 | 1 | 1 | 1 | 1 | 1 | 1 | 1 |
| | | 1,2,3,4-tetra-hydroquinoline | 0.5 | 0.5 | 0.5 | 0.5 | 0.5 | 0.5 | 0.5 | 0.5 | — | — | — | — | 0.5 | 0.5 | 0.5 | 0.5 | 0.5 | 0.5 | 0.5 | 0.5 |
| | | Triethylamine | — | — | — | — | — | — | — | — | 0.5 | 0.5 | 0.5 | 0.5 | — | — | — | — | — | — | — | — |
| Results | | Fitting compression shearing adhesive force | 140 | 348 | 348 | 347 | 80 | 150 | 140 | 141 | 280 | 350 | 345 | 351 | 260 | 510 | 505 | 520 | 190 | 341 | 340 | 341 |
| | | Tensile shearing force | 38.9 | 114 | 115 | 115 | 22.3 | 56.0 | 55.0 | 55.5 | 59 | 110 | 108 | 116 | 40 | 211 | 210 | 220 | 35 | 160 | 160 | 163 |

(Numbers: Kg/cm²)

It is obvious from Table I that each of Samples Nos. 1b, 1c, 1d, 2b, 2c, 2d, 3b, 3c, 3d, 4b, 4c, 4d, 5b, 5c and 5d, in which the phosphorus compound was blended (all of these samples correspond to the present invention), were very excellent in both of fitting - compression - shearing adhesive force and tensile shearing adhesive force in comparison with any of samples Nos. 1a, 2a, 3a, 4a and 5a, in which the phosphorus compound was not blended. (All of these samples are concerned with prior arts).

It can be said from the facts that the compositions of this invention are extremely excellent in adhesive force.

EXAMPLE VI 100 parts of tetra-ethylene glycol dimethacrylate as an anaerobically polymerizable monomer, 2 parts of cumene hydroperoxide as an organic peroxide and bis (2-hydroxyethyl methacrylate) acid phosphate (J P A 515) and 2-hydroxyethyl methacrylate acid phosphate (J P A 515) as phosphorus compounds were blended and mixed homogeneously in the compounding ratio indicated on Table II to obtain the compositions of samples Nos. 1 to 20.

Then, each of these compositions was tested to measure the adhesive forces of fitting - compressive - shear and tensile shear. The results are shown on Table II. The measurements were carried out in the same manner as mentioned above.

Table II

Numbers: rate by weight to the weight of monomer (part(s))

| Sample No. | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Phosphorus compound | Bis(2-hydroxy)ethyl methacrylate) acid phosphate (JPA 514) | 0.01 | — | 0.03 | 0.05 | 0.07 | 0.1 | 0.3 | — | 0.3 | — | — | — | — | — | — | — | — | — | — |
| | 2-hydroxy ethyl methacrylate acid phosphate (JPA 515) | 0.01 | 0.02 | 0.02 | — | — | 0.03 | — | 0.2 | 0.5 | 0.7 | 1.0 | 2 | — | 5 | — | 5 | — | 10 | 20 | 5 | 25 |
| Fitting compound | | | | | | | | | | | | 3 | 5 | 5 | 10 | 10 | 10 | 15 | 10 | — | 20 | — |
| Results | ring adhesive force | 191 | 186 | 286 | 286 | 350 | 355 | 340 | 341 | 341 | 340 | 351 | 340 | 420 | 410 | 380 | 390 | 410 | 340 | 351 | 358 |
| | Tensile shearing force | 38 | 36 | 151 | 150 | 161 | 163 | 165 | 165 | 165 | 162 | 161 | 165 | 163 | 163 | 163 | 161 | 163 | 160 | 163 | 165 |

(Numbers: Kg/cm²)

It becomes apparent from Table II that the addition amount of phosphorus compounds should be at least 0.05 weight percent to the weight of monomer. When it is smaller than said amount, the adhesive force decreases with respect to both fitting - compression - shearing and tensile shearing adhesive force. (See samples Nos. 1 and 2)

Furthermore, it also becomes apparent from Table II that all of the samples containing phosphorus compounds exhibit excellent results in both of single use of J P A 515 or J P A 515 and combination use thereof.

I claim:

1. In an anaerobic adhesive composition comprising an anaerobically polymerizable acrylic ester monomer or mixtures thereof and an organic peroxide characterized wherein said composition contains therein phosphorus compounds having the following general formulas (A) and (B) singly or in combination, in an amount of at least 0.05 and not more than 20 parts per weight per 100 parts per weight of said monomer, thereby to enhance an adhesive force of the composition;

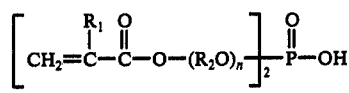

(A)

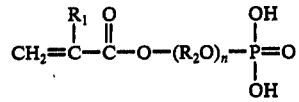

(B)

in the formulas (A) and (B), $R_1$ indicates H, $CH_3$, or $C_2H_2$, $R_2$ indicates $-CH_2-$, $-C_2H_4-$, $-C_3H_6-$ or

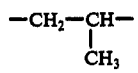

and $n$ indicates an integer from 1 to 10.

2. The composition as claimed in claim 1 wherein said acrylic ester monomer or mixtures includes 2,2-bis (4-methacryloxy di-ethoxy phenyl) propane.

3. The composition as claimed in claim 1 wherein said acrylic ester monomer or mixtures includes tri-methylol propane tri-methacrylate.

4. The composition as claimed in claim 1 wherein said acrylic ester monomer or mixtures includes tetra-ethylene glycol di-methacrylate.

5. The composition as claimed in claim 1 wherein said organic peroxide is cumene hydroperoxide.

6. The composition as claimed in claim 1 wherein said phosphorus compound having the general formula (A) is bis (2-hydroxyethyl methacrylate acid phosphate.

7. The composition as claimed in claim 1 wherein said phosphorus compound having the general formula (B) is 2-hydroxyethyl methacrylate acid phosphate.

8. The composition as claimed in claim 1 wherein said amount of phosphorus compound is in the range of from 0.1 to 10 parts.

9. The composition as claimed in claim 2 in which said amount of phosphorus compound is in the range of from 0.1 to 10 parts.

10. The composition as claimed in claim 3 in which said amount of phosphorus compound is in the range of from 0.1 to 10 parts.

11. The composition as claimed in claim 4 in which said amount of phosphorus compound is in the range of from 0.1 to 10 parts.

12. The composition as claimed in claim 1 in which the mixture of monomers includes at least two of the following: 2,2-bis (4-methacryloxy di-ethoxy phenyl) propane; tri-methylol propane tri-methacrylate; and tetra-ethylene glycol di-methacrylate.

13. The composition as claimed in claim 12 in which said amount of phosphorus compound is in the range of from 0.1 to 10 parts.

* * * * *